(12) United States Patent  
Sollars

(10) Patent No.: US 6,260,112 B1
(45) Date of Patent: Jul. 10, 2001

(54) REGISTER MEMORY LINKING

(75) Inventor: Donald L. Sollars, Milpitas, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/036,403

(22) Filed: Mar. 5, 1998

(51) Int. Cl.[7] ................................................. G06F 12/08
(52) U.S. Cl. ........................... 711/118; 711/137; 711/140; 711/167; 710/130
(58) Field of Search ........................... 711/118, 137, 711/140, 167, 168, 125, 126, 169; 710/130

(56) References Cited

U.S. PATENT DOCUMENTS 5,860,151 * 1/1999 Austin et al. ...................... 711/213
5,895,503 * 4/1999 Belgard ............................ 711/202
5,930,820 * 7/1999 Lynch .............................. 711/132

* cited by examiner

*Primary Examiner*—Hiep T. Nguyen

(57) ABSTRACT

A method and apparatus are provided for addressing a sequence of orderly spaced memory locations of a computer system, without requiring the address of each memory location to be retrieved from a register of the computer system. This is accomplished by storing at least part of the sequence into a cache memory of the computer system during a first operation referencing a first memory location within the sequence, detecting that a second operation references a second memory location within the sequence and retrieving the contents of the second memory location from the cache memory in parallel with calculating the memory address of the second memory location.

13 Claims, 10 Drawing Sheets

Fig. 3A

|Word Block\\0|1|2|3|
|---|---|---|---|
|0||A0|A1|A2|
|1|||||
|2|||B0|B1|
|3|||||

Fig. 3A

|Word Block\\0|1|2|3|
|---|---|---|---|
|0||A0|A1|A2|
|1|||||
|2|||B0|B1|
|3|B2|B3|B4|B5|

Fig. 3B

|Word Block\\0|1|2|3|
|---|---|---|---|
|0||A0|A1|A2|
|1|A3|A4|A5|A6|
|2|||B0|B1|
|3|B2|B3|B4|B5|

Fig. 3C

REGISTER MEMORY LINKING

BACKGROUND OF THE INVENTION

1. Field of the Invention

The present invention relates generally to computer processors and more particularly to the addressing of memory locations in computer processors.

2. Related Art

FIG. 1A shows a prior art computer system 100, including a processor 110, a system memory 120 and a cache memory 130. Processor 110, system memory 120 and cache memory 130 are connected by means of buses 115 and 125. In addition, a bank of registers 140 is provided on processor 100. Often times computer processors, such as processor 100, perform operations on data which is stored in sequences of orderly spaced memory locations of system memory 120. The contents of portions of system memory 120 can be mapped to cache memory 130 to speed up memory access time. Examples of such operations include displaying an image on a screen of a computer system, performing a calculation on a spreadsheet, etc. When these operations are performed, the computer processors repeatedly execute a same instruction on data stored in consecutive memory locations. For example, a running total of expenses entered on a spreadsheet, where data representing each entry into the spreadsheet is stored in a sequence of memory locations orderly spaced at a predetermined interval (e.g., every 1, 2, 4 . . . locations) starting at an arbitrary address in system memory 120, can be computed as shown in FIG. 1B. First, the starting address of the sequence of memory locations is stored in a first register (R1) of processor 110 in stage 150. The contents of the memory location at that memory address (i.e., the first entry in the spreadsheet) are stored in a second register (R3) of processor 110 in stage 160. A displacement value is added to R1 in stage 170, so that, at the end of stage 170, R1 contains the address of the second entry of the spreadsheet. The contents of the memory location pointed to by R1 are retrieved and stored in a third register (R2) in stage 180. The contents of registers R2 and R3 are then added in stage 190 and the result is stored into R3. Stage 195 then determines whether the last entry in the spreadsheet has been added to the running total, in which case the operation terminates. Otherwise, stages 170–195 are repeated until all entries have been added to the running total.

Since retrieving the contents of each memory location in the sequence from system memory 120 requires a substantial amount of processing time, a cache memory 130 can be used to speed up the process. Cache memories are typically faster and more expensive than other computer memories and are used to temporarily store a subset of the information stored in system memory 120. If the data used most frequently by processor 110 is stored in cache memory 130, the time required to perform operations on processor 110 can be substantially reduced. Several schemes are used to control which data is stored in the cache memory. When the processor executes an instruction referencing the contents of a location in the computer memory, the cache memory is first checked to see whether the contents of the memory location are already stored in the cache memory. Data stored in cache memory 130 can be read directly from cache memory 130 without accessing system memory 120. However, if the data is not stored in cache memory 130, the contents of the memory location must be retrieved from system memory 120 and (optionally) stored in cache memory 130.

When an operation is to be conducted on a sequence of orderly spaced memory locations, such as in the running total example above, it is desirable to load as many of the block memory locations into cache memory 130 as possible. However, using the addressing techniques of prior art processors, when an instruction referencing a sequence of memory location is decoded by processor 110, the address of the memory location is read from a register of the processor 110. The address is then compared to the tag field of the cache memory entries to determine whether the contents of the memory location are already stored in cache memory 130 and the data is then retrieved either from cache memory 130 or from system memory 120. However, even in cases where the sequence is already stored in cache memory 130, steps 150–195 still need to be performed sequentially (i.e., as part of the critical path). In multiscalar processors (i.e., processors that can execute multiple instructions in parallel), this scheme results in an inefficient use of processor resources, due to the length of the critical path.

SUMMARY OF THE INVENTION

The present invention provides a method and apparatus for addressing a sequence of evenly spaced memory locations of a computer system, without requiring the address of each memory location to be retrieved from a register of the computer system. This is accomplished by storing at least part of the sequence into a cache memory of the computer system during a first operation referencing a first memory location within the sequence, detecting that a second operation references a second memory location within the sequence and retrieving the contents of the second location from the cache memory in parallel with calculating the memory address of the second memory location, reducing the length of the critical path and allowing for faster processing on multiscalar processors.

BRIEF DESCRIPTION OF THE DRAWINGS

FIGS. 3A–3C are block diagrams showing the contents of cache memory 130 at successive times during an operation on two consecutive sequences of memory locations, A and B.

DETAILED DESCRIPTION OF THE DRAWINGS

Figure 1A:
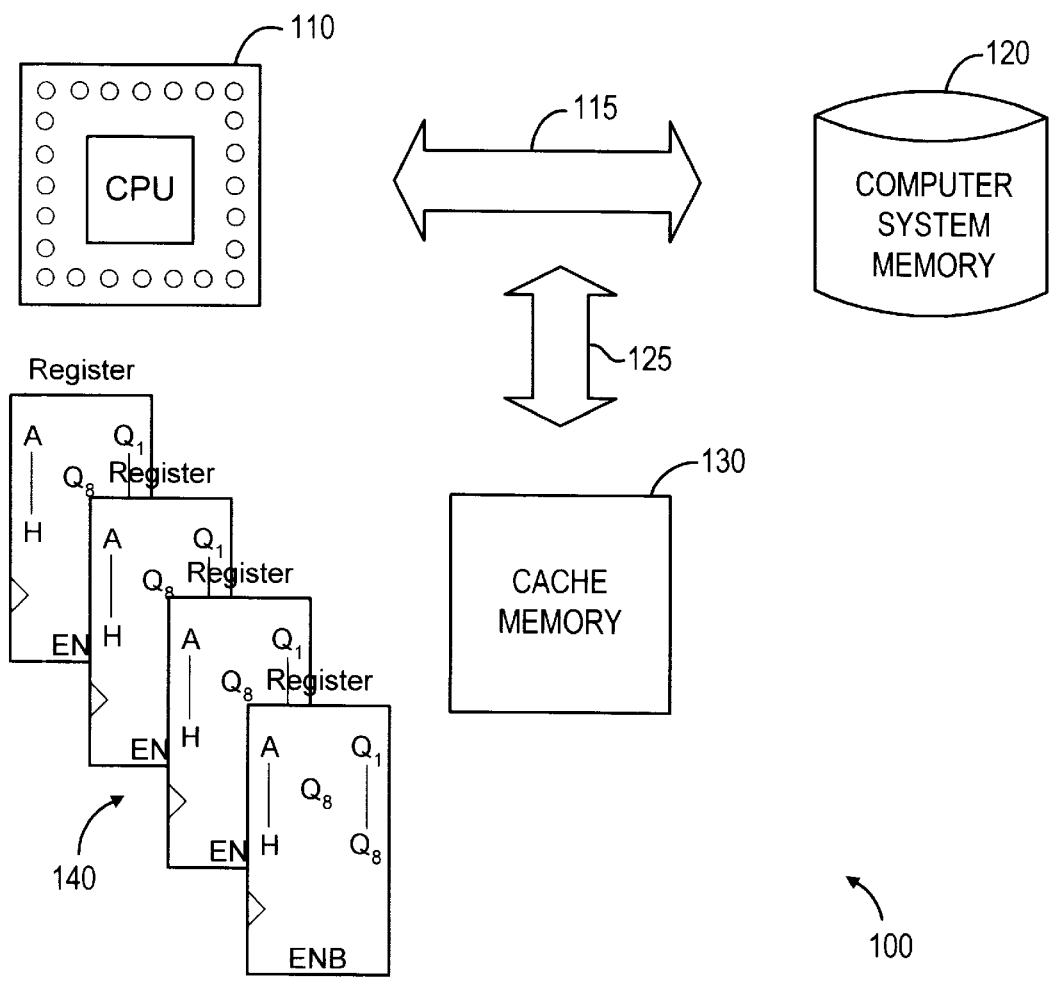
FIG. 1A shows a prior art computer system including a processor, a system memory and a cache memory.
Figure 1B:
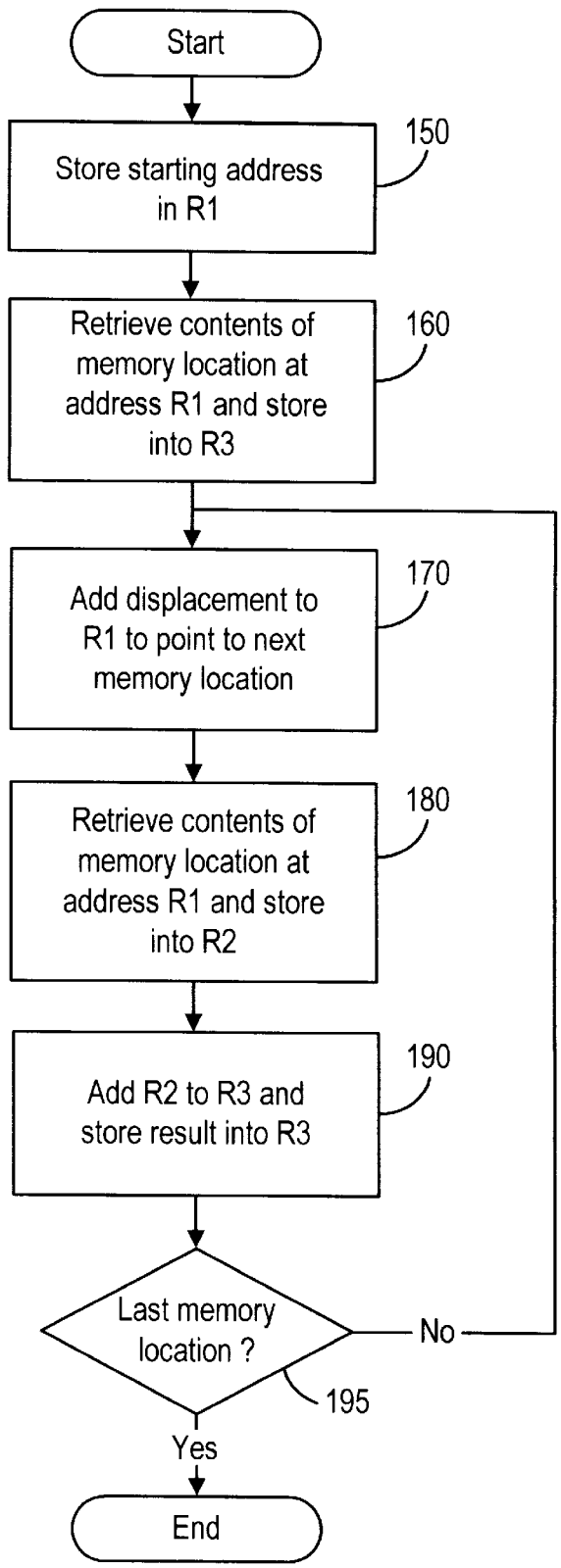
FIG. 1B is a flow diagram of a prior art operation for computing a running total of the entries in a spreadsheet.
Figure 2A:
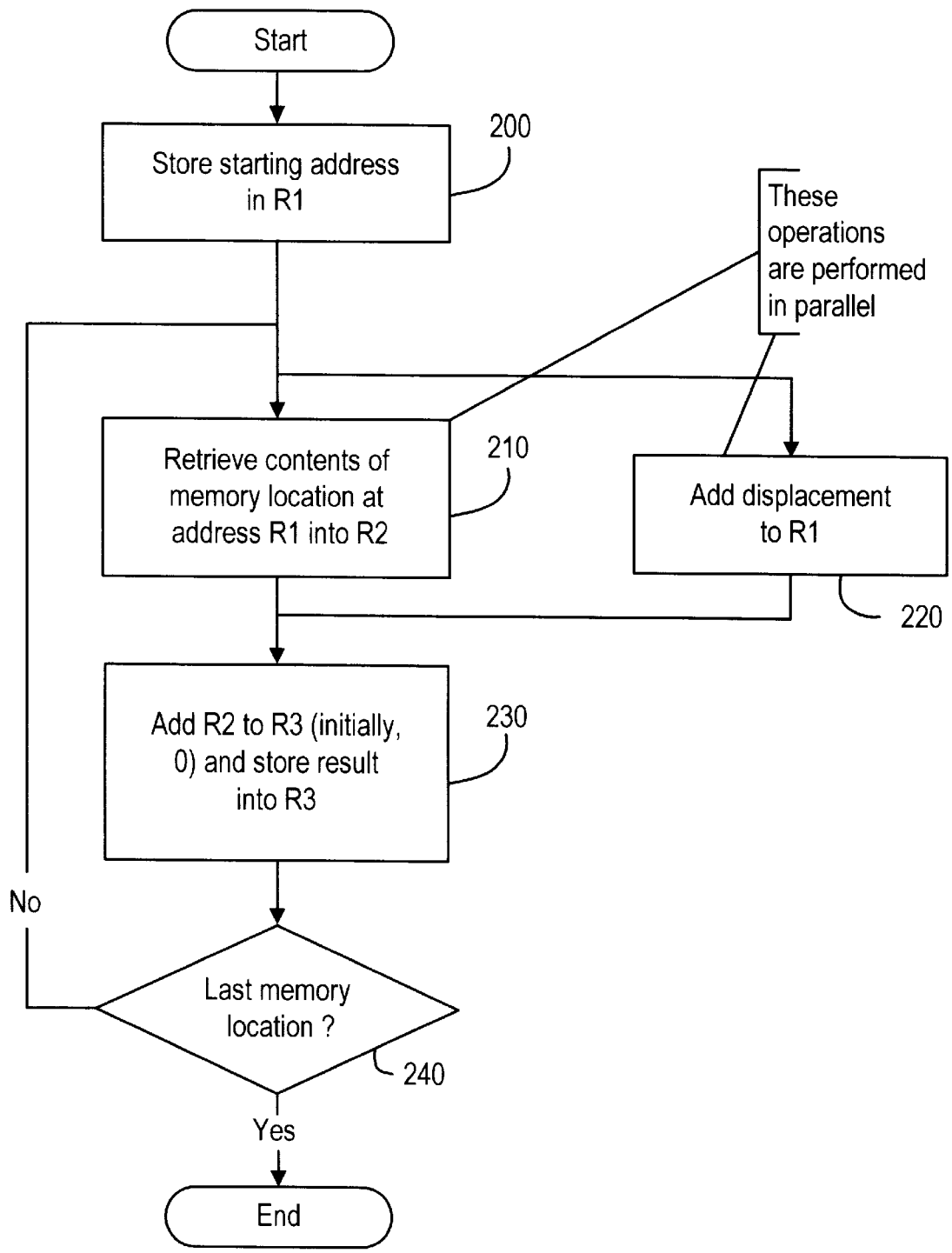
FIG. 2A is a flow diagram of the operation of FIG. 1, as modified according to some embodiments of the invention.

FIG. 2A is a flow diagram of the operation of FIG. 1, as modified according to some embodiments of the invention.

First, the address of the memory location of the first spreadsheet entry is stored in register R1 in stage 200. The contents of the memory location whose address is stored in register R1 are then retrieved from system memory 120 and stored in register R2 in stage 210. During stage 220, the contents of register R1 are updated by adding a displacement value to R1, so that R1 contains the address of the next spreadsheet entry stored in system memory 120. Unlike in the prior art, the operations of stages 210 and 220 are performed in parallel, reducing the number of operations in the critical path. The contents of registers R2 and R3 (initially 0) are added in stage 230 and the result is stored into register R3. Stage 240 determines whether the last memory location (in the previous example, the last entry in the spreadsheet) has been added to the running total, in which case the operation terminates. Otherwise, stages 210–240 are repeated until all entries in the spreadsheet have been added to the running total stored in register R3.

Figure 2B:
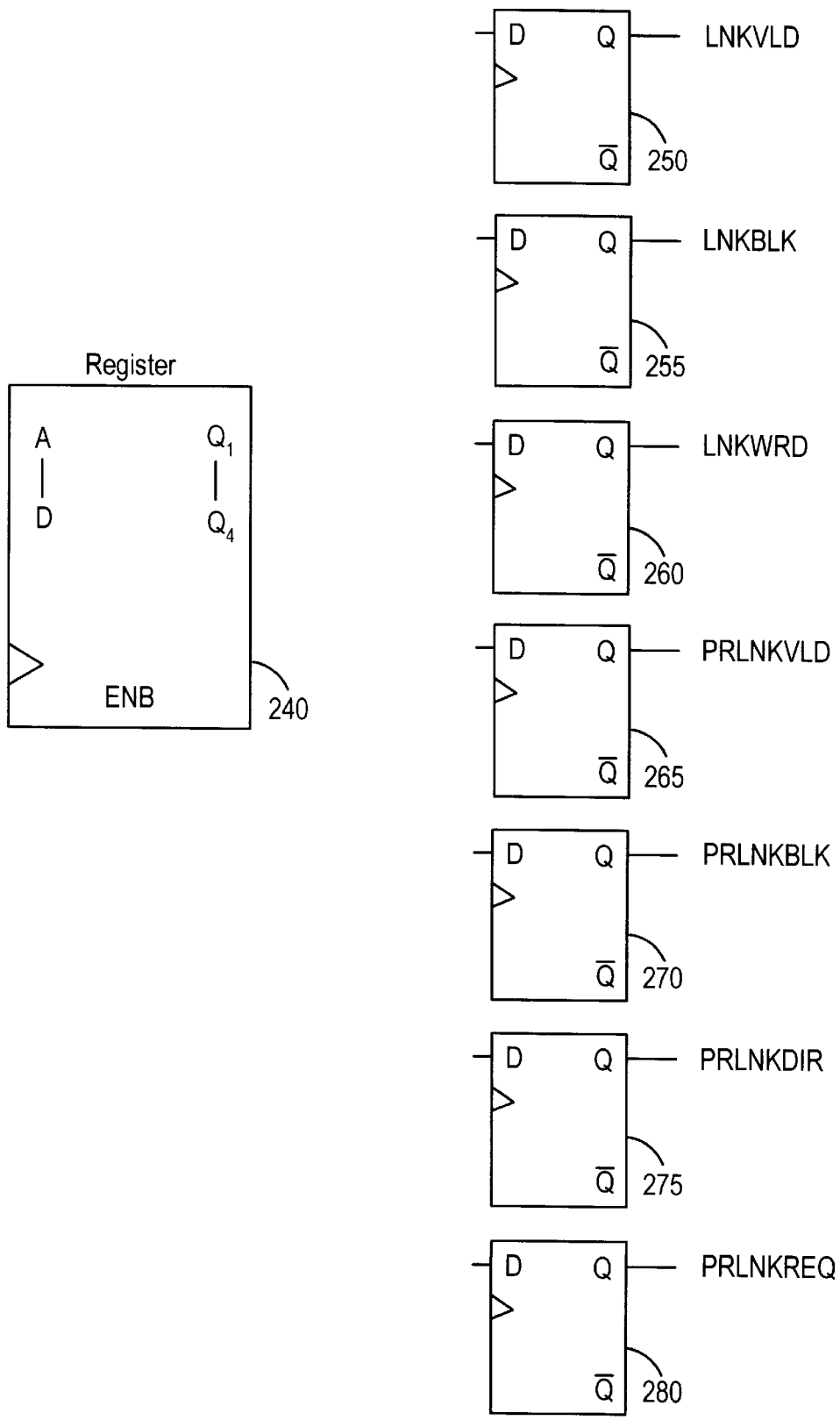
FIG. 2B is a schematic diagram of a register modified according to some embodiments of the invention.

This is achieved by adding additional information to each register of register file 140, as shown in FIG. 2B. In FIG. 2B, link registers 250, 255, 260, 265, 270, 275 and 280 are added to register 240. By storing information indicating that register 240 is linked to a word of cache memory 130 in which the contents of a memory location in the sequence are stored, the contents of additional memory locations in the sequence stored in cache memory 130 can be retrieved directly from cache memory 130 in parallel with computing the memory address of the memory locations.

When cache memory 130 is used, the contents of the memory location pointed to by the contents of register R1 may be retrieved from cache memory 130 rather than from system memory 120 to speed up the process. Cache memory 130 comprises multiple memory locations organized in blocks. Each block has multiple words of data and each word has a number of bits. The number of blocks in cache memory 130, the number of words in each block and the number of bits in each word are entirely arbitrary. For example, in the embodiment described in FIGS. 3A–3C, cache memory 130 has four blocks of four words of data. For simplicity, we will assume that a word has the same number of bits required to store an entry into the spreadsheet described in FIGS. 1 and 2 (e.g., 16 bits). In FIGS. 3A–3C, the four blocks of cache memory 130 are numbered consecutively from 0 to 3 in the vertical direction. Within each of the blocks, the words are numbered consecutively from 0 to 3 in the horizontal direction. To allow data to be mapped in and out of cache memory 130, system memory 120 is likewise divided in a number of blocks of the same size as the blocks of cache memory 130. Thus, a block of frequently used data can be mapped from system memory 120 into cache memory 130 by copying the contents of the block of memory locations of system memory 120 into a block of memory locations of cache memory 130.

FIGS. 3A–3C illustrate how data stored in system memory 120 is mapped into cache memory 130 in the case of an operation involving two sequences of memory locations, A and B. For example, each memory location in sequences A and B may be an entry in a spreadsheet, as described with respect to FIGS. 1B and 2A. First, as shown in FIG. 3A, the contents of a block including the first memory location of sequence A are stored in block 0 of cache memory 130. Likewise, the contents of a block including the first memory location of sequence B are stored in block 2 of cache memory 130. Since system memory 120 is divided in blocks having the same size as the blocks of cache memory 130, the contents of the first memory locations of sequences A and B can be stored in any word of blocks 0 and 2. Typically, however, memory locations are mapped into a cache block according to an address alignment scheme (e.g., the contents of a memory location at memory address n would be mapped to cache block word n mod <# of words in the block>). For purposes of the embodiments described herein, it is presumed that a similar address alignment scheme is employed. Those skilled in the art will realize how to modify the embodiments described herein for different address alignment schemes (e.g., by adding or subtracting an offset from the memory address). For example, in FIG. 3A, the contents of the first memory location of sequence A (A0) are stored in the second word of the first block (block 0, word 1), while the contents of the first memory location of sequence B (B0) are stored in the third word of the third word (block 2, word 2).

Since block 2 only contains the first two memory locations of sequence B, namely B0 and B1, once A0, B0, A1 and B1 have been processed, the next block of memory locations of sequence B must be mapped into cache memory 130, as shown in FIG. 3B. In the example of FIG. 3B, B2–B5 are stored into words 0–3 of block 3. Similarly, once A2 and B2 have been processed, the next block of memory locations of sequence A is stored in block 1 of cache memory 130, as shown in FIG. 3C. To expedite the operation, when the first memory location of a block of cache memory 130 is reached, the next block of the sequence is prefetched while the block memory locations are processed.

Thus, once the first block containing memory locations from a sequence has been stored in cache memory 130, the contents of the memory locations in the sequence can be retrieved directly from cache memory 130. While the memory locations in the first block are processed, additional blocks can be prefetched from system memory 120. However, in order to take advantage of cache memory 130 for speeding up the processing of data stored in sequences of memory locations, processor 110 must recognize that such a sequence is being processed. In some embodiments of the invention this is accomplished by linking a register to a sequence of memory locations. This operation is referred to as "register memory linking." As explained with respect to FIG. 2B, a number of bits are added to one or more registers of the processor to indicate that the address of a sequence of memory locations is stored in the register and that the contents of one or more of the memory locations are stored in cache memory 130. Special processor instructions can also be provided to allow register memory linking.

Figure 4A:
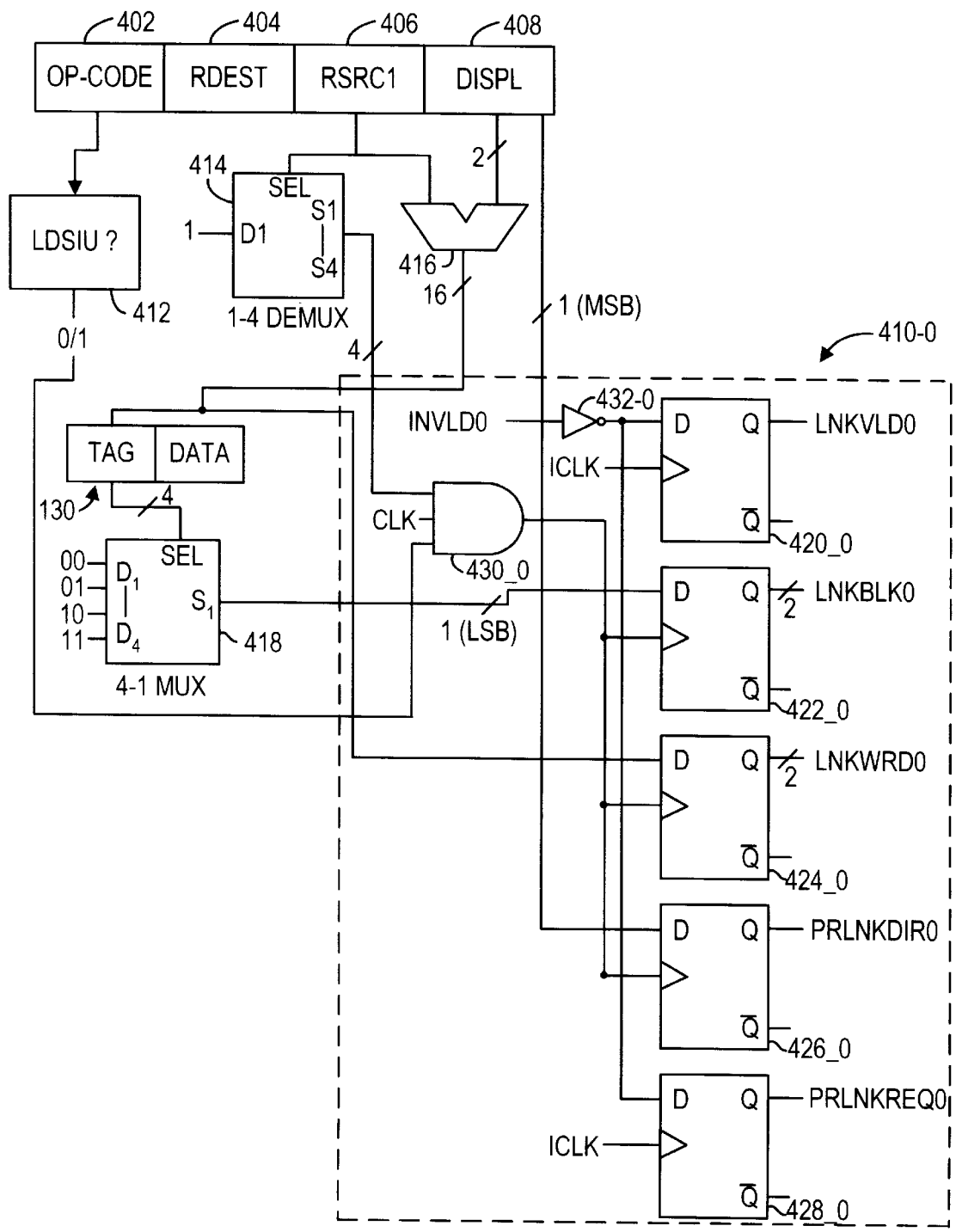
FIG. 4A is a schematic diagram of a circuit for establishing a register memory link, according to some embodiments of the invention.

An example of such an instruction is LoaD_Short_Immediate_with_Update (LDSIU) 400, shown in FIG. 4A. The LDSIU instruction is made up of an operation code OP-CODE, a destination register RDEST, a source register RSRC1 and an immediate displacement DISPL. When processor 110 executes an LDSIU instruction 400, the contents of the memory location whose address is stored in register RSRC1 are retrieved and stored in register RDEST. In addition, the displacement value DISPL is added to the address value stored in register RSRC1. If the displacement value DISPL represents the number of bytes between memory locations in the sequence (referred to as "stride"), after the LDSIU instruction is executed register RSRC1 contains the address of the next consecutive location in the sequence. While instruction LDSIU 400 is described for clarity, those skilled in the art will realize how the principles of the present invention can be applied to instructions other than LDSIU. In fact, an arbitrary number of instructions can be easily devised in light of this disclosure and the present invention is not limited to any particular instruction or to any number of instructions.

FIGS. 4A–4F illustrate logic circuits for implementing register memory linking on a computer system including a processor, a cache memory and a number of registers, according to some embodiments of the invention. This circuits are exemplary in nature and the invention is in no way limited to the specific circuits described herein. Those skilled in the art will readily realize how the principles of the present invention can be applied to other circuits or other equivalent implementations. For example, the invention can be implemented in hardware, firmware, software or any combination thereof.

FIG. 4A is a schematic diagram of a circuit for establishing a link between a register of register file 140 and a memory location of system memory 120 whose contents are stored in cache memory 130. In FIG. 4A, an instruction (e.g., LDSIU) 400 is read into an instruction register of processor 110. The instruction 400 has an operation code 402, a destination address 404, a source address 406 and an immediate value 408. In the case of an LDSIU instruction, these fields are OP-CODE, RDEST, RSRC1 and DISPL respectively, as explained above. The decoding circuitry of processor 110 comprises a register linking module 410 for one or more of the registers, a decoder 412, a demultiplexer 414, an adder 416 for computing the address of the next memory location in the sequence and a multiplexer 418. Each register linking module 410_n (where n=0,1,2 . . . ) includes a logical AND gate 430_n, an inverter 432_n and a series of registers 420_n, 422_n, 424_n, 426_n port of adder 416 represents the address of the next memory location in the sequence. The bus is in turn connected to a select (SEL) port of cache memory 130. If the contents of the memory location are already stored in cache memory 130, a tag value is asserted on a line connected to an output port of cache memory 130. In the present example, it is presumed that the contents of the memory location are already present in cache memory 130. Otherwise, the contents of the memory location are retrieved from system memory 120 and stored in cache memory 130. This line in turn drives a select (SEL) port of multiplexer 418. Input ports of multiplexer 418 are connected to sources of logical values 00, 01, 10 and 11 representing addresses of the blocks of cache memory 130. As a result, the value on an output port of multiplexer 418 indicates the block of cache memory 130 in which the contents of the next memory location are stored.

An input terminal of inverter 432_n is connected to an INVLD signal for each of the registers and an output terminal of inverter 432_n is in turn connected to a D terminal of registers 420_n and 428_n. As a result, when the INVLD signal is HIGH, registers 420_n and 428_n are reset on the next rising edge of a clock (CLK) signal.

The values stored in registers 420_n, 422_n, 424_n, 426_n and 428_n when a register link is established are generated as follows. A D terminal of register 420_n is connected by a line to an output terminal of inverter 432_n and is thus driven HIGH when port of adder 416 represents the address of the next memory location in the sequence. The bus is in turn connected to a select (SEL) port of cache memory 130. If the contents of the memory location are already stored in cache memory 130, a tag value is asserted on a line connected to an output port of cache memory 130. In the present example, it is presumed that the contents of the memory location are already present in cache memory 130. Otherwise, the contents of the memory location are retrieved from system memory 120 and stored in cache memory 130. This line in turn drives a select (SEL) port of multiplexer 418. Input ports of multiplexer 418 are connected to sources of logical values 00, 01, 10 and 11 representing addresses of the blocks of cache memory 130. As a result, the value on an output port of multiplexer 418 indicates the block of cache memory 130 in which the contents of the next memory location are stored.

An input terminal of inverter 432_n is connected to an INVLD signal for each of the registers and an output terminal of inverter 432_n is in turn connected to a D terminal of registers 420_n and 428_n. As a result, when the INVLD signal is HIGH, registers 420_n and 428_n are reset on the next rising edge of a clock (CLK) signal.

The values stored in registers 420_n, 422_n, 424_n, 426_n and 428_n when a register link is established are generated as follows. A D terminal of register 420_n is connected by a line to an output terminal of inverter 432_n and is thus driven HIGH when the INVLD signal is LOW and LOW when the INVLD signal is HIGH. Thus, unless a register memory link is being invalidated, signal LNKVLDn on an output terminal of register 420_n is HIGH, indicating that the link is valid. A D port of register 422_n is connected to the output port of multiplexer 418 and thus signal LNKBLKn on an output port of register 422_n indicates the block of cache memory 130 to which the link is established. A D terminal of register 424_n is connected to the two Least Significant Bits (LSBs) of the bus tied to the output of adder 416. The LSB represents a word offset with respect to the block. Thus signal LNKWRD_n on an output terminal of register 424_n indicates the word in the block of cache memory 130 to which the link is established. Similarly, a D terminal of register 428_n is connected to the Most Significant Bit (MSB) of immediate value 408, which, in the case of an LDSIU instruction, represents the sign of the displacement value DISPL. Thus, if the displacement value is less than the cache block size, signal PRLNKDIRn on an output terminal of register 426_n indicates whether the next block of system memory locations to be stored in cache memory 130 is the block immediately preceding or following the link block. Finally, a D terminal of register 428_n is connected to the output terminal of inverter 432_n and thus signal PRLNKREQn on an output terminal of register 428_n is asserted when the link is established.

Figure 4B:
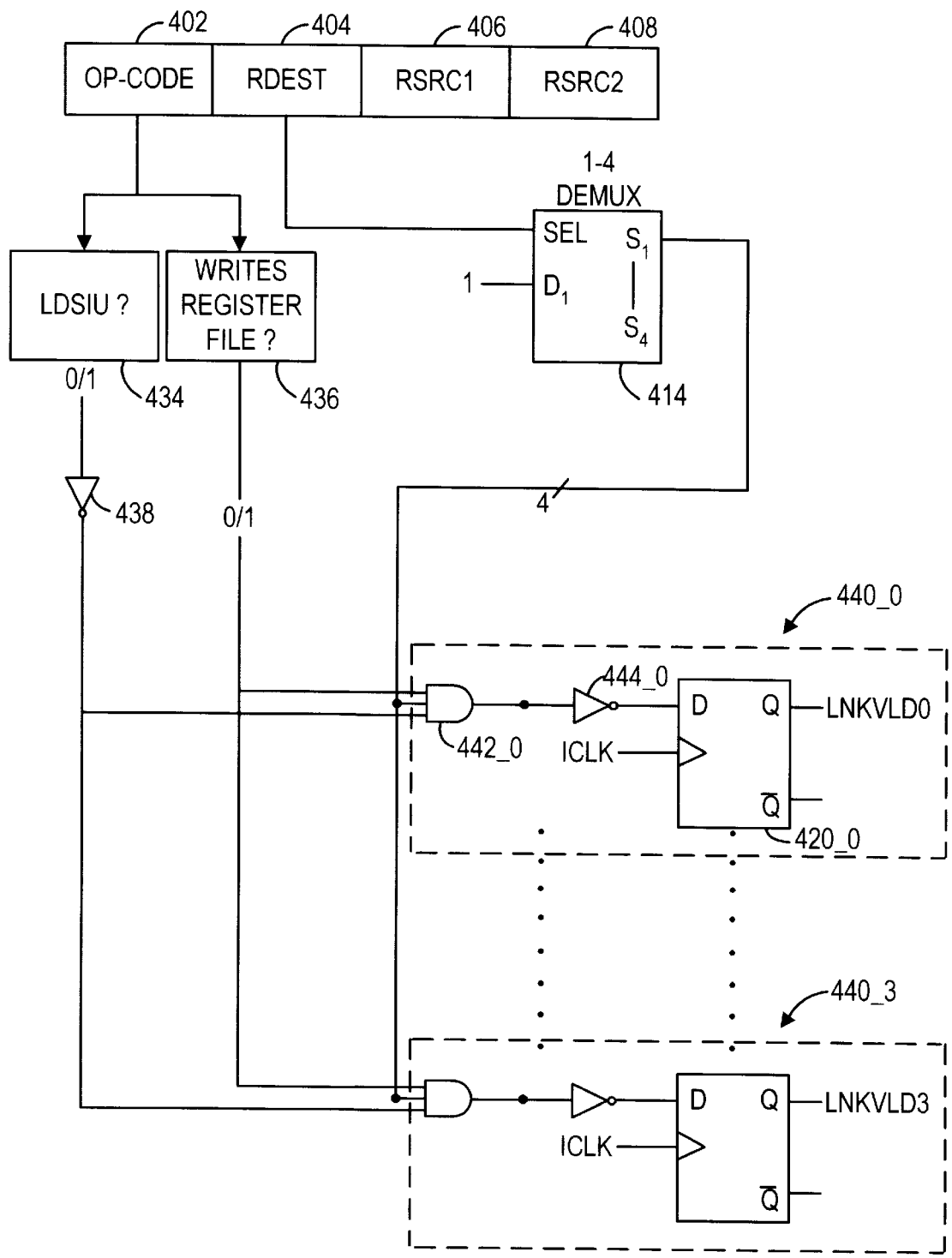
FIG. 4B is a schematic diagram of a circuit for invalidating a register memory link, according to some embodiments of the invention.

FIG. 4B a schematic diagram of a circuit for invalidating a register memory link. This circuit includes a couple of decoders 434 and 436 for decoding operation code 402, demultiplexer 414 and a link invalidation module 440_n for each register in register file 140. For clarity, only the link invalidation modules 440_n for the first and the last registers of register file 140 are shown in FIG. 4B. Each link invalidation module 440_n has a first logical AND gate 442_n, an inverter 444_n, a second logical AND gate 446_n and a register 420_n. An output terminal of gate 442_n is connected to an input terminal of inverter 444_n, while an invalidate clock (ICLK) signal is supplied to a clock terminal of register 420_n. The output terminal of inverter 444_n is connected to a D terminal of register 420_n. Thus, when a signal is asserted on the output terminal of gate 442_n, a negated signal (representing a logical ZERO value) is received on the D terminal of register 420_n and is stored into register 420_n on a next rising edge of the ICLK signal, indicating that the link is no longer valid.

The operation code 402 of instruction 400 is routed to decoders 434 and 436. If instruction 400 is an LDSIU instruction, a signal on a line connected to an output terminal of decoder 434 is asserted. Link invalidation is necessary if an operation, other than LDSIU, that writes to register file 140 is performed on a linked register since such an operation may alter the contents of the register. This line is in turn connected to an input terminal of inverter 438, whose output terminal is connected to an input terminal of gate 442__n. As a result, the signal on a line connected to an output terminal of inverter 438 is asserted only when instruction 400 is not an LDSIU instruction. Similarly, if instruction 400 is an instruction that writes to register file 140, a signal on a line connected to an output terminal of decoder 436 is asserted. This line is in turn connected to a second input terminal of gate 442. Finally, destination register 404 is routed to a select (SEL) port of demultiplexer 414. A logical ONE source is connected to a D terminal of demultiplexer 414. Only one of the signals on the lines connected to output terminals of demultiplexer 414 is asserted. As a result, gate 442__n of only one link invalidation modules 440__n is enabled for invalidation.

Figure 4C:
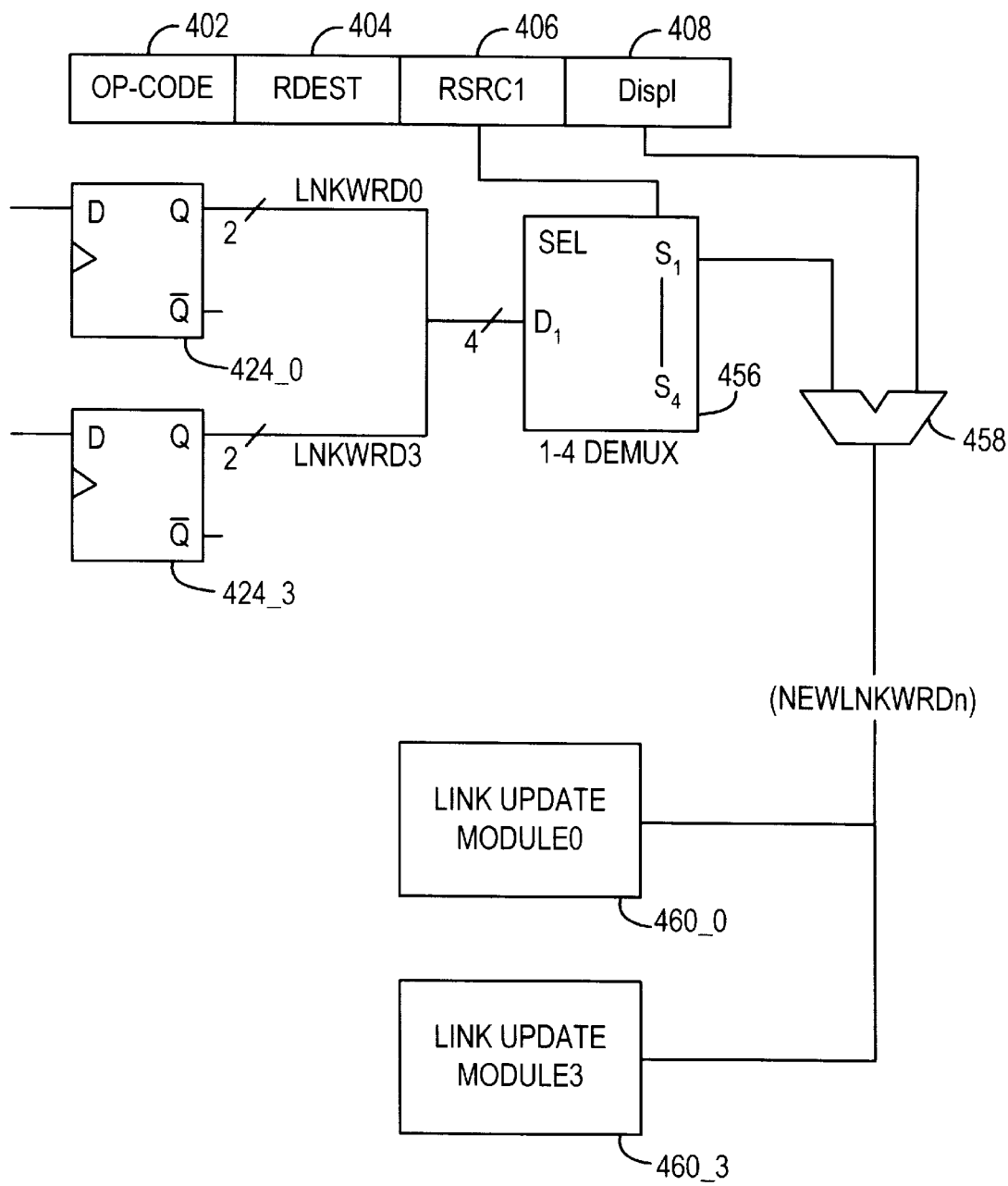
FIG. 4C is a schematic diagram of a circuit for updating a register memory link, according to some embodiments of the invention.

FIG. 4C illustrates a circuit for updating an existing register memory link. An existing link is updated when a new LDSIU instruction is executed which references an already linked register. In FIG. 4C, it is thus presumed that operation code 402 has already been decoded as corresponding to an LSDIU instruction as shown in FIG. 4A. The circuit includes registers 424 that store the value of the LNKWRD bit for each of the registers in register file 140, a demultiplexer 456, an adder 458 and link update modules 460__n for each register in register file 140.

The contents of source register 406 are routed to a select (SEL) port of demultiplexer 456 so that the value stored in only one of registers 424__n is routed to an input port of adder 458. This value indicates a word in a block of cache memory 130 that is currently linked to the register specified by source register 406. Immediate value 408 is routed to the other input port of adder 458. As a result, a value representing the next word to be linked to the register (NEWLNKWRD) is supplied on a line connected to an output port of adder 458. This line is in turn connected to link update modules 460__n, only one of which is enabled as described with respect to FIG. 4A.

Figure 4D:
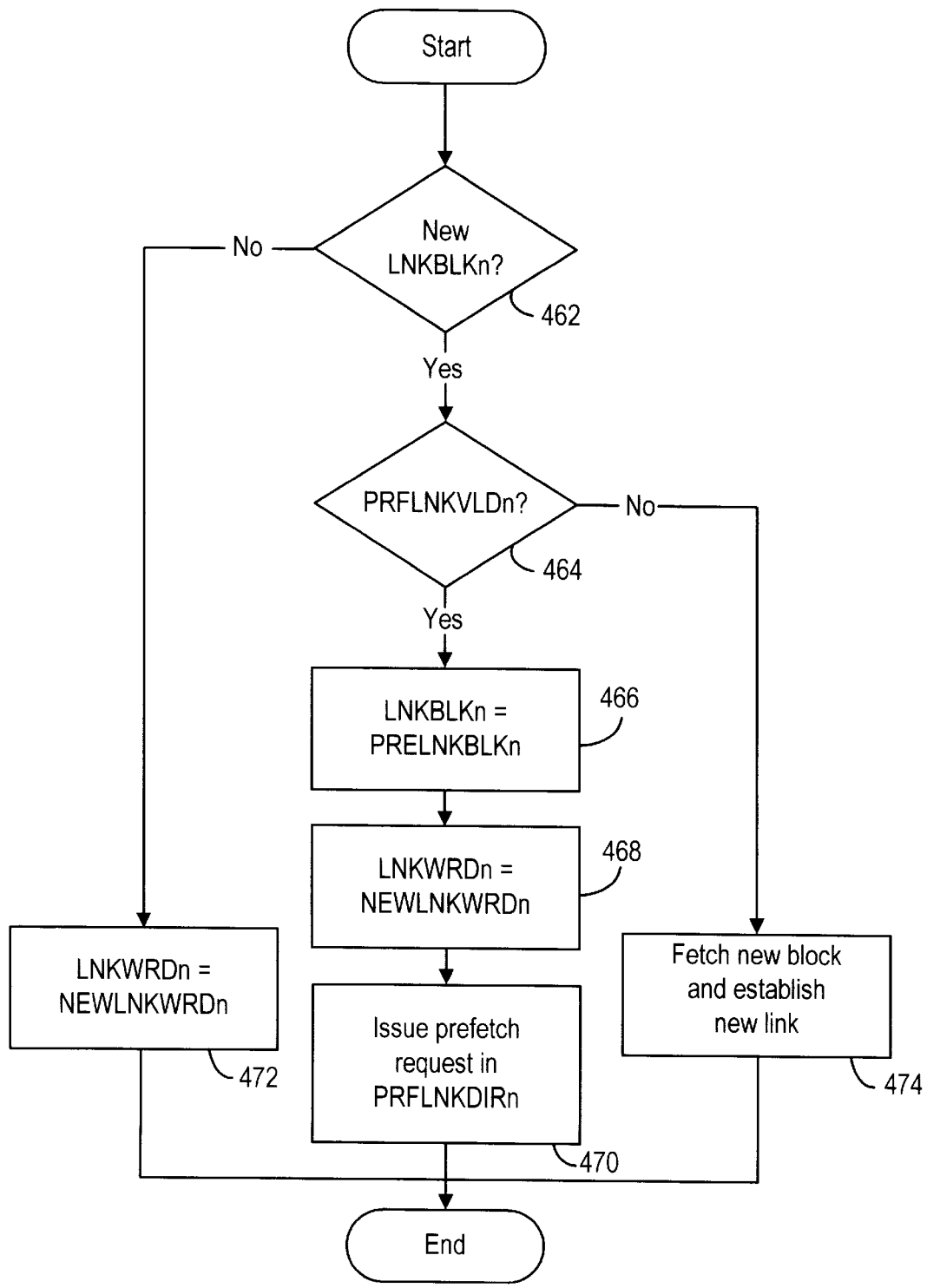
FIG. 4D is a flow diagram of a link update module of FIG. 4C.

FIG. 4D is a flow diagram of the process of updating the values of registers 422__n, 424__n and 426__n (FIG. 4A) implemented by link modules 460__n (FIG. 4C). First, stage 462 determines whether a new LNKBLKn is required, in which case the operation proceeds to stage 464. Otherwise, in stage 472, the value on the line connected to adder 458 is stored in register 424__n and the operation terminates. Stage 464 tests the value stored in register 265 (FIG. 2B). If this value is a logical ONE, indicating that the prefetch link is valid, the operation proceeds to stage 466. Otherwise, in stage 474, a new block is fetched and a new link is established as described in FIG. 4A. The prefetch link is invalid, for example, if the displacement value is such that the next memory location is in a block other than the block immediately preceding or following the currently linked block. In stage 466, the value stored in register 270 (FIG. 2B) is stored in register 422__n. Then, in stage 468, a value corresponding to the new LNKWRDn is stored in register 424__n. Finally, in stage 470, register 426__n is updated depending on the value of the carry bit of adder 458 (FIG. 4C) and the operation terminates.

Figure 4E:
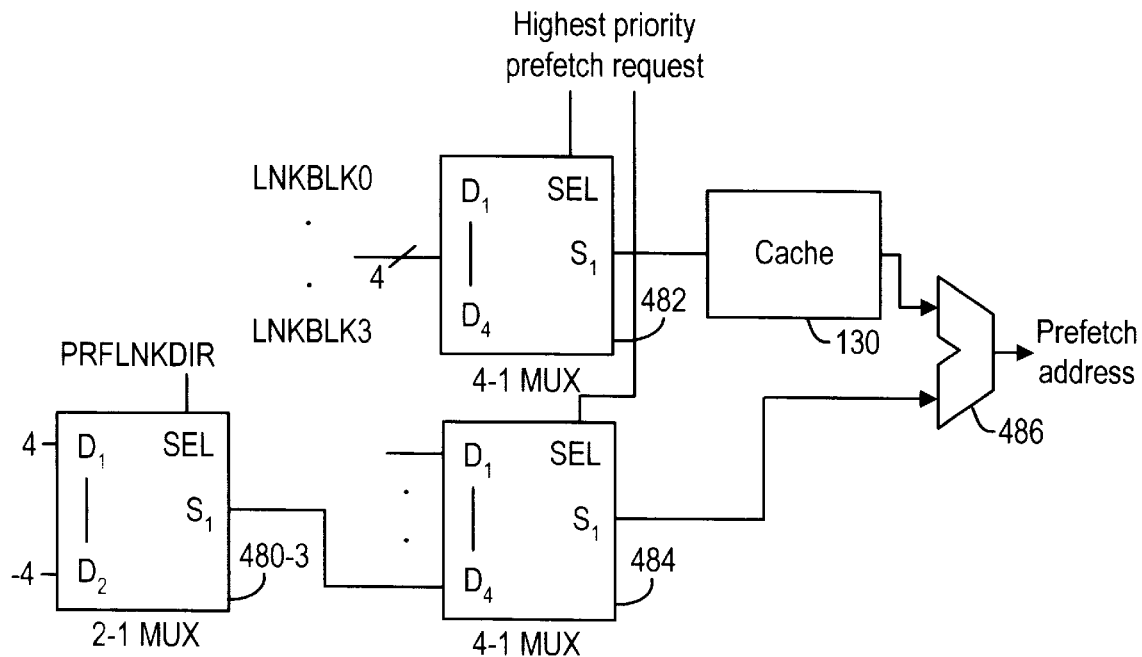
FIG. 4E is schematic diagram of a circuit for generating a prefetch block address, according to some embodiments of the invention.

FIG. 4E is a schematic diagram of a circuit for generating the address of a block of memory locations to be prefetched from system memory 120. The circuit includes a multiplexer 480__n for each register in register file 140, multiplexers 482 and 484, cache memory 130 and an adder 486. First, a PRFLNKDIRn signal on an output port of register 426 is supplied to a select (SEL) port of multiplexer 480__n to determine which of values −4 and 4 (the number of words in a block) connected to respective input ports of multiplexer 480__n is supplied on an output port of multiplexer 480__n connected to an input port of multiplexer 484. Then, a request arbitrator (not shown) determines which register in register file 140 that has a prefetch request pending has the highest priority. A signal generated by the request arbitrator is used to control a select (SEL) port of multiplexers 482 and 484. The tags fields of all blocks in cache memory 130 are supplied to input ports of multiplexer 482. Thus, the values on the output ports of multiplexers 482 and 484 correspond to the cache block selected by the request arbitrator. A starting memory address of the memory locations mapped into a cache block are used as a tag for the cache block. As a result, the tag field of a register having the highest priority for prefetch request is supplied on a line connected to an input port of adder 486. Thus, a value representing the starting memory address of the next block to be fetched is supplied on an output port of adder 486.

Figure 4F:
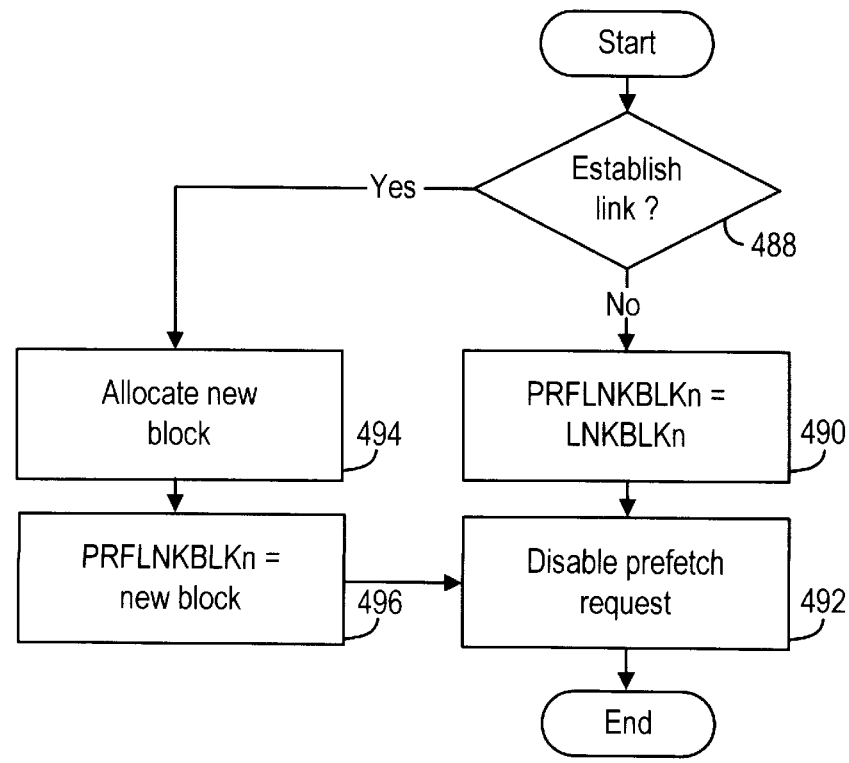
FIG. 4F is a flow diagram of a prefetch block request operation, according to some embodiments of the invention.

Once the prefetch address has been generated, a fetch request is issued to system memory 120. In parallel with the memory fetch operation, a cache block is selected for storing the contents of the memory block being retrieved. FIG. 4F is a flow diagram of the process of selecting a block of cache memory 130 (FIG. 1A) to be overwritten with the contents of the memory block. Initially, stage 488 determines whether a register memory link is being established, in which case the operation proceeds to stage 490. Otherwise the operation proceeds to stage 494. In stage 490, the value stored in register 422 (FIG. 4A) is stored in register 270 (FIG. 2B) and the operation proceeds to stage 492. In stage 494, a new block is allocated. A value representing the new block is then stored in register 270 and the operation proceeds to stage 492. Finally, in stage 492, register 428__n (FIG. 4A) is reset to indicate that the prefetch operation is completed.

Only two blocks of cache memory 130 are used for any given sequence of memory locations of system memory 120 at any given time, namely a link block and a prefetch block. In fact, when the prefetch block becomes the new link block, the old link block becomes available and can be used as the new link block. As a result, the number of sequences of memory locations in system memory 120 that can be linked to registers in register file 140 is equal to half the number of blocks in cache memory 130.

Embodiments described above illustrate but do not limit the invention. In particular, the invention is not limited to any particular hardware implementation. The circuits shown in the drawings are purely exemplary in nature. Those skilled in the art realize that the principles of the invention can be applied to circuits other than those disclosed herein. Furthermore, the invention is not limited to any type or number of registers or processors, nor to any number of bits of information added to the registers. In fact, the invention can be applied to an arbitrary number of registers of an arbitrary number of processors. Other embodiments and variations are within the scope of the invention, as defined by the following claims.

What is claimed is:

1. An apparatus for addressing a sequence of orderly spaced memory locations of a computer system, comprising:
   a processor;
   a cache memory; and
   instruction decoding circuitry;
   wherein:
      at least a portion of data stored in the sequence of orderly spaced memory locations is first stored into the cache memory during a first operation referencing a first memory location within the sequence;

a second operation referencing a second memory location within the sequence is detected by the instruction decoding circuitry; and contents of the second memory location are retrieved from the cache memory in parallel with calculating a memory address of the second memory location.

2. The apparatus of claim 1, wherein the processor further comprises a plurality of registers and at least a first register includes one or more bits indicating that the contents of the first memory location are stored in the cache memory.

3. The apparatus of claim 2, wherein before completion of the first operation the first register contains an address corresponding to the first memory location.

4. The apparatus of claim 3, wherein before completion of the first operation the bits of the first register indicate:

that a link between the first register and the cache memory is valid;

a block of the cache memory in which the contents of the first memory location are stored; and a word of the block in which the contents of the first memory location are stored.

5. The apparatus of claim 4, wherein the bits of the first register further indicate that data in a new block of memory locations of the system memory is to be stored in the cache memory in the second operation.

6. The apparatus of claim 5, wherein the first operation further references a displacement and the bits of the first register further indicate that the new block is the block of memory location immediately preceding or following the block of memory locations of the system memory currently stored in the cache memory depending on the value of the displacement.

7. The apparatus of claim 2, wherein after completion of the first operation the first register contains an address corresponding to the second memory location.

8. The apparatus of claim 7, wherein after completion of the first operation the bits of the first register indicate:

that a link between the first register and the cache memory is valid;

a block of the cache memory in which the contents of the first memory location are stored; and a word of the block in which the contents of the first memory location are stored.

9. The apparatus of claim 2, wherein the instruction decoding circuitry further comprises:

at least one demultiplexer;

at least one adder; and a plurality of logic gates.

10. A method of processing data stored in a sequence of memory locations of a system memory of a computer system, wherein the computer system further comprises a processor, a cache memory and instruction decoding circuitry, the method comprising:

storing at least a portion of data stored in the sequence of orderly spaced memory locations into the cache memory during a first operation referencing a first memory location within the sequence;

detecting in the instruction decoding circuitry a second operation referencing a second memory location within the sequence; and retrieving contents of the second memory location from the cache memory in parallel with calculating a memory address of the second memory location.

11. The method of claim 10, wherein the processor further comprises a plurality of registers and at least a first register includes one or more bits indicating that the contents the first memory location are stored in the cache memory.

12. The method of claim 11, wherein before completion of the first operation an address corresponding to the first memory location is stored in the first register.

13. The method of claim 11, wherein after completion of the first operation an address corresponding to the second memory location is stored in the first register.

* * * * *